US009260573B2

(12) United States Patent
Weder et al.

(10) Patent No.: US 9,260,573 B2
(45) Date of Patent: Feb. 16, 2016

(54) DYNAMIC MECHANICAL POLYMER NANOCOMPOSITES

(71) Applicants: Christoph Weder, Shaker Heights, OH (US); Stuart J. Rowan, Cleveland Heights, OH (US); Jeffrey R. Capadona, North Ridgeville, OH (US); Dustin J. Tyler, Highland Heights, OH (US); Kadhiravan Shanmuganathan, Cleveland, OH (US); Otto van den Berg, Grembergen (BE)

(72) Inventors: Christoph Weder, Shaker Heights, OH (US); Stuart J. Rowan, Cleveland Heights, OH (US); Jeffrey R. Capadona, North Ridgeville, OH (US); Dustin J. Tyler, Highland Heights, OH (US); Kadhiravan Shanmuganathan, Cleveland, OH (US); Otto van den Berg, Grembergen (BE)

(73) Assignees: CASE WESTERN RESERVE UNIVERSITY, Cleveland, OH (US); THE UNITED STATES OF AMERICA AS REPRESENTED BY THE DEPARTMENT OF VETERANS AFFAIRS, Washington, DC (US)

(*) Notice: Subject to any disclaimer, the term of this patent is extended or adjusted under 35 U.S.C. 154(b) by 395 days.

(21) Appl. No.: 13/718,027

(22) Filed: Dec. 18, 2012

(65) Prior Publication Data

US 2013/0165554 A1  Jun. 27, 2013

Related U.S. Application Data

(62) Division of application No. 12/384,729, filed on Apr. 8, 2009, now Pat. No. 8,344,060.

(60) Provisional application No. 61/123,372, filed on Apr. 8, 2008.

(51) Int. Cl.
| | |
|---|---|
| *C08L 1/00* | (2006.01) |
| *C08K 5/09* | (2006.01) |
| *C08K 7/02* | (2006.01) |
| *B82Y 30/00* | (2011.01) |
| *C08J 5/00* | (2006.01) |
| *C08K 7/00* | (2006.01) |

(52) U.S. Cl.
CPC .............. *C08J 5/005* (2013.01); *B82Y 30/00* (2013.01); *C08L 1/00* (2013.01); *C08K 7/00* (2013.01)

(58) Field of Classification Search
CPC .............. C08L 1/00; C08K 5/09; B82Y 30/00
USPC .................................................... 524/35, 496
See application file for complete search history.

(56) References Cited

U.S. PATENT DOCUMENTS

| 5,902,518 A | 5/1999 | Khazai et al. |
| 7,897,248 B2 | 3/2011 | Barrera et al. |
| 2007/0176319 A1 | 8/2007 | Thostenson et al. |

OTHER PUBLICATIONS

"A Versatile Approach for the Processing of Polymer Nanocomposites with Self-assembled Nanofibre Templates", Capadona et al., Nature Nanotechnology vol. 2, Dec. 2007, 765-769, Nature Publishing Group.*
"Review of Recent Research into Cellulosic Whiskers, Their Properties and Their Application in Nanocomposite Field", Samir et al, Biomacromolecules 2005, 6, 612-626, American Chemical Society.
"Elastic Modulus and Stress-Transfer Properties of Tunicate Cellulose Whiskers", Sturcova et al., Biomacromolecules 2005, 6, 1055-1061, American Chemical Society.
"Solid Polymer Electolytes Based on Nanocomposites of Ethylene Oxide-Epichlrohydrin Copolymers and Cellulose Whiskers", Schroers et al., Journal of Applied Polymer Science, vol. 93, 2883-2888 (2004), Wiley periodicals, Inc.
"Nanocomposites Based on Cellulose Whiskers and (semi)conducting Conjugated Polymers", Van den Berg et al, J. Mater. Chem., 2007, 17, 2746-2753 , The Royal Society of Chemistry.
"Rodlike Cellulose Microcrystals: Structure, Properties, and Applications", Lima et al, Macromolecular Rapid Communications 2004, 25, 771-787, Wiley-VCH Verlag GmbH& Co. KGaA, Weinheim.
"Liquid Crystal Systems for Fibrillar Polysaccharides" Bowen, et al., Aug. 22, 1959, vol. 184 632-633, Nature Publishing Group.
"Preparation of Homogeneous Dispersions of Tunicate Cellulose Whiskers in Organic Solvents", van den Berg et al., Biomacromolecules 2007, 8, 1353-1357, American Chemical Society.

* cited by examiner

*Primary Examiner* — Bijan Ahvazi
*Assistant Examiner* — Ronald Grinsted
(74) *Attorney, Agent, or Firm* — Hudak, Shunk & Farine Co. LPA

(57) ABSTRACT

Polymer nanocomposites exhibit a reversible change in stiffness and strength in response to a stimulus. The polymer nanocomposites include a matrix polymer with a comparably low modulus and strength and nanoparticles that have a comparably high modulus and strength. The particle-particle interactions are switched by the stimulus, to change the overall material's mechanical properties. In a preferred embodiment, a chemical regulator is used to facilitate changes of the mechanical properties. Methods for inducing modulus changes in polymer nanocomposites are also disclosed.

20 Claims, 14 Drawing Sheets

DYNAMIC MECHANICAL POLYMER NANOCOMPOSITES

CROSS REFERENCE

This application is divisional application of pending U.S. patent application Ser. No. 12/384,729, filed Apr. 8, 2009 for DYNAMIC MECHANICAL POLYMER NANOCOMPOSITES, which claims priority of U.S. Provisional Application Ser. No. 61/123,372 filed on Apr. 8, 2008, all fully incorporated herein by reference.

FIELD OF THE INVENTION

The present invention relates to polymer nanocomposites that exhibit a reversible change in stiffness and strength in response to a stimulus. The polymer nanocomposites include a matrix polymer with a comparably low modulus and strength and nanoparticles that have a comparably high modulus and strength. According to the invention, the particle-particle interactions are switched by the stimulus, to change the overall material's mechanical properties. In a preferred embodiment, a chemical regulator is used to facilitate changes of the mechanical properties. Methods for inducing modulus changes in polymer nanocomposites are also disclosed.

BACKGROUND OF THE INVENTION

Many echinoderms, such as sea cucumbers, share the ability to rapidly and reversibly alter the stiffness of their connective tissue. In the case of sea cucumbers, this morphing occurs within seconds and creates considerable survival advantages. A series of recent studies on the dermis of these invertebrates has provided evidence that this defense mechanism is enabled fay a nanocomposite structure in which rigid, high-aspect ratio collagen fibrils reinforce a viscoelastic matrix of fibrillin microfibrils. The stiffness of the tissue is regulated by controlling the stress transfer between adjacent collagen fibrils through transiently established interactions. These interactions are modulated by soluble macromolecules that are secreted locally by neurally controlled effector cells. The dermis of the *Cucumaria frondosa* and other sea cucumber species represents a compelling model of a chemo responsive material in which a modulus contrast by a factor of 10 (~5 to ~50 MPa) is possible.

In view of the above, it would be desirable to provide artificial dynamic materials that exhibit stimuli-responsive mechanical properties similar to the abilities displayed by many echinoderms, especially materials that could be used in biomedical applications.

SUMMARY OF THE INVENTION

The present invention discloses polymer nanocomposites that exhibit reversible modulus and strength switching in response to stimuli such as a chemical, thermal and/or electrical stimulus. Relatively, large orders of modulus contrast can be obtained utilizing the systems disclosed by the present invention.

Methods of inducing modulus switching in polymer nanocomposites are also disclosed, wherein the modulus contrast is a factor greater than 2.5. A wide range of nanoparticles can be used to induce modulus changes in an array of matrix polymers.

Accordingly, it is an objective of the present invention to provide stimuli-responsive polymer nanocomposites that exhibit reversible modulus changes.

It is a further objective of the present invention to provide methods for inducing modulus changes in polymer nanocomposites. The method incorporates a stimuli such as chemical or electrical stimuli.

In one aspect of the present invention, a method for inducing a modulus change in a polymer nanocomposite is disclosed, comprising the steps of providing a polymer nanocomposite comprising a nanoparticle network incorporated into a host matrix polymer, wherein the nanoparticle network is a substantially continuous three-dimensional network of substantially dispersed nanoparticles that exhibit at least some interactions among each other; and inducing a modulus change in the polymer nanocomposite by exposing the polymer nanocomposite to a stimulus that reduces interactions among the nanoparticles, wherein the modulus change exhibited is by a factor greater than 2.5.

In another aspect of the present invention, a method for inducing a modulus change in a polymer nanocomposite is disclosed, comprising the steps of providing a polymer nanocomposite comprising a nanoparticle network incorporated into a host matrix polymer, wherein the nanoparticle network is a substantially continuous three-dimensional network of substantially dispersed nanoparticles; and inducing a modulus change in the polymer nanocomposite by exposing the polymer nanocomposite to at least a combination of chemical and temperature stimuli that reduce nanoparticle self-interactions, wherein the modulus change exhibited is by a factor greater than 2.5.

In still a further aspect of the present invention, a polymer nanocomposite is disclosed, comprising a nanoparticle network incorporated into a host matrix polymer, wherein the nanoparticle network is a formation of a substantially three-dimensional network of substantially dispersed nanoparticles, wherein in a first switched state, the composite has a first modulus, and wherein in a second unswitched state, the composite has a second modulus, wherein the first modulus is greater than the second modulus by a factor greater than 2.5.

BRIEF DESCRIPTION OF THE DRAWINGS

The invention will be better understood and other features and advantages will become apparent by reading the detailed description of the invention, taken together with the drawings, wherein.

DETAILED DESCRIPTION OF THE INVENTION

The variable modulus polymer nanocomposites are derived from a matrix polymer and nanoparticles dispersed therein. Achieving a balance of attractive and repulsive interactions between the nanoparticles is a key for producing polymer nanocomposites exhibiting desired dynamic mechanical properties.

Numerous different types of nanoparticles can be utilized in the present invention. Generally any nano-size particles can be utilized, in one embodiment, nanoparticles that can disperse substantially fully in at least one solvent system are preferred. Nanoparticles must have particle-particle interactions which include, but are not limited to, hydrogen bonding, ionic charges, hydrophobic interactions, or pi-pi stacking. For example, nanoparticles suitable for use in the present invention include, but are not limited to, nanofibers, for example cellulose-based whiskers: nanotubes such as carbon nanotubes and nano-size platelet materials, such as certain clays, or a combination thereof. In a preferred embodiment, the nanoparticles have a relatively high aspect ratio—length L/diameter d (L/d), of about 5 or more, preferably 10 or more, more preferably 20 or more, and most preferably 50 or more. Nanofibers are preferred nanoparticles in one embodiment.

To create the stimulus-responsive nanocomposites according to the present invention, a substantially continuous three-dimensional network of substantially dispersed nanoparticles that exhibit at least some interactions among each other, preferably a dynamic nanofiber network of the nanoparticles, is formed in the host polymer, preferably through a solution casting or a sol/gel process.

For example, in the case of tunicate whiskers, this involves the formation of a homogeneous whisker dispersion in a medium, such as water, such as taught by M. M. de Sauza Lima, R. Borsali R., *Macromol. Rapid Commun.* 25, 771 (2004); M. A. S. A. Samir, F. Alloin, A. Dufresne, *Biomacromolecules* 6, 612 (2005); R. H. Marchessault, F. F. Morehead, N. M. Walter, *Nature* 184, 632 (1959); A. Sturcova, J. R. Davies, S. J. Eichhorn, *Biomacromolecules* 6, 1055 (2005); and O. van den Berg, J. R. Capadona, C. Weder, *Biomacromolecules* 8, 1353 (2007), herein incorporated by reference. Sonication or other methods of dispersion such as stirring or high shear mixing can be used to disperse the nanoparticies in a preferred embodiment.

Figure 1:
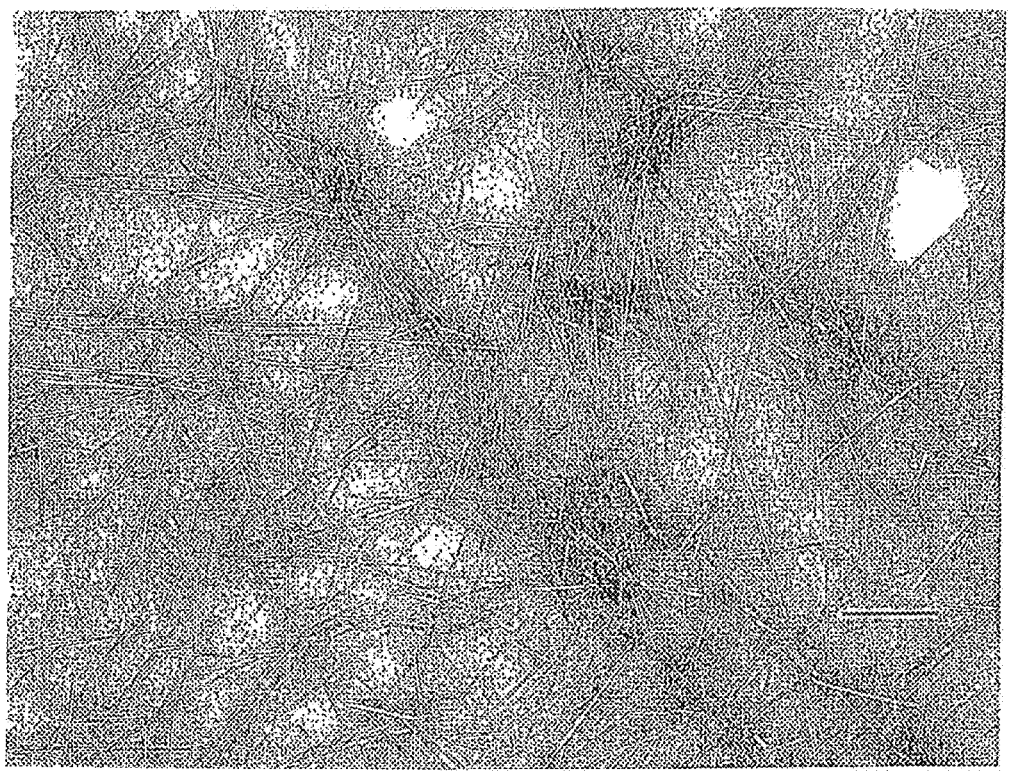
FIG. 1 is a transmission electron microscopy image of tunicate whiskers isolated from tunicate mantles (scale bar=1 µm)

One or more of the water and solvents utilized to disperse the nanoparticles can include additional components such as, but not limited to, various additives such as stabilizers, monomers, polymers, surfactants, etc. As indicated herein, biorenewable nanoparticles, such as the cellulose-based whiskers, are preferred in one embodiment, and are available from a number of sources, such as wood, cotton and various animals such as tunicates. Tunicate whiskers exhibit high stiffness, tensile modulus about 143 GPa and dimensions at the nanometer scale, for example 26 nm by 2.2 µm, see FIG. 1. Similar nanofibers can be obtained from a number of renewable biosources including wood and cotton.

Tunicate whiskers, are desirable for use as their aspect ratio Is relatively high, which is advantageous for the formation of percolating architectures. Because, of the high density of strongly interacting surface hydroxyl groups, cellulose whiskers have a strong tendency for aggregation. The whisker-whisker interactions can be moderated by the introduction of sulfate surface groups, which promote dispersability in select hydrogen-bond-forming solvents. This balance of attractive and repulsive interactions is an important factor for the fabrication of cellulose-whisker nano-composites. Good dispersion is achieved during processing when whisker self-interactions are "switched off" by competitive binding with a hydrogen-bond-forming solvent. Upon evaporation of the solvent, the interactions among the whiskers are "switched on" and they assemble into a percolating network. This architecture and strong interactions among the whiskers maximize stress transfer and therewith the overall modulus of the nanocomposite.

One preferred method to fabricate the stimulus-responsive nano-composites according to the present invention is a template approach such as taught by J. R. Capadona, O. van den Berg, L. Capadona, D, Tyler, S. Rowan, and C. Weder, *Nature Nanotechnology* 2, 765 (2007), herein incorporated by reference. Following whisker dispersion in a medium such as water, as described above, a whisker gel is formed through solvent exchange with a solvent that is medium-miscible, such as water-miscible, but does not disperse the whiskers. Various water-miscible solvents known in the art can be utilized including, but not limited to, acetone, methanol, tetrahydrofuran, ethanol, acetonitrile, dioxane and isopropanol, or a combination thereof.

The whisker content of the gels can be controlled over a broad range by the concentration of the initial whisker dispersion, the volume ratio of organic solvent to whisker dispersion, wherein more solvent leads to lower whisker content, and the nature of the solvent, i.e., the solvation energy thereof. Within the framework of the template approach, one or more polymers or copolymers utilized to form the polymer nanocomposites are dissolved in an appropriate solvent. The solvent is selected so that it does not substantially re-disperse the nanoparticles network in the gel described. Many different polymers and copolymers can be utilized as a host polymer. Examples of suitable (co)polymers, i.e., polymers or copolymers, include, but are not limited to, various alkylene oxide polymers and copolymers such as ethylene oxide, propylene oxide, copolymers of ethylene oxide and epichlorohydrin and/or other monomers; a vinyl aromatic (co)polymer such as polystyrene and styrene copolymers; polyolefin polymers or copolymers such as polyethylene and polypropylene; diene polymers and copolymers, such as cis-polybutadiene; polyacrylates and acrylate copolymers, such as methyl methacrylate; polyamides; and polyester polymers or copolymers such as polyvinyl acetate) or polycaprolactone.

Within the framework of the template approach, the nanoparticle gel is imbibed with the polymer solution. The resulting nanocomposite is dried and, if desired, processed and/or shaped further, Another preferred method to fabricate the stimulus-responsive nano-composites according to the present invention is casting from a common solvent such as taught by O. van den Berg, M. Schroeter, J. R. Capadona, and C. Weder, *J. Mater. Chem.* 17, 2746 (2007), herein incorporated by reference. While the nanoparticles are dispersed in a medium include such as, for example, but not limited to, water, N,N-dimethyl formamide, dimethyl sulfoxide, N-methyl pyrrolidone, formic acid, m-cresol, or a combination thereof, as described above one or more desired polymer or copolymers are dissolved in a suitable solvent. The amounts of polymer incorporated info the solvent can vary as desired. The polymer solvent can comprise auxiliary components if desired, such as, but not limited to, stabilizers, surfactants, etc., if desired. Compatible polymer solvents are known to those of ordinary skill in the art.

In a preferred embodiment of the invention, the polymer is dissolved in the same solvent or combination of solvents as is used to disperse the nanoparticles. Examples of suitable polymer solvents include, for example, but are not limited to, water, N,N-dimethyl formamide, dimethyl sulfoxide, N-methyl pyrrolidone, formic acid, m-cresol, or a combination thereof. The range of polymer in the solvent in one embodiment can be from about 1 to about 40% w/w, but this dependent on the viscosity of the polymer solution and it is to be understood that the amounts can be higher or lower depending on the polymer and solvent utilized.

Polymer nanocomposites are prepared by combining the desired amounts of the colloidal nanoparticles dispersion and polymer solution, and solution casting the resulting preferably homogenous mixture. In one embodiment, the solution in a desired vessel is placed into a vacuum oven to evaporate the solvent and dry the resulting film. In one embodiment, the vacuum oven has a temperature of 60° C., pressure of 15 mbar. Suitable pressures and drying times will vary depending upon the system utilized.

In one embodiment, the resulting polymer nanocomposites are shaped: after the fabrication by, for example, the template approach or casting from a common solvent; this can be achieved, for example by compression molding at a desired pressure for a predetermined period of time, or any other melt-process that is known to those skilled in the art. For example, when the polymer chosen is an ethylene oxide-epichlorohydrin copolymer (EO-EPI), the polymer nanocomposite can be compression molded at a temperature of about 80° C. at about 600 psi for about two minutes, in a further embodiment, when the polymer is polyvinyl acetate (PVAc), compression molding can be performed at about 90° C. at 0 psi for about two minutes, followed by an increase in pressure to 3,000 psi for about 15 minutes. Compression molding is utilized in one embodiment to yield nanocomposite films, such as about 20 to about 500 micrometers.

It is desirable to have a concentration of nanoparticles in the host matrix polymer, such that the nanoparticles form a substantially percolating network in a stiff or switched state. As known to those of ordinary skill in the art, the percolation concentration can be estimated from the aspect ratio of the nanoparticles utilizing standard percolation models. For example, in one embodiment, the nanoparticles, such as tunicate whisker nanoparticles, may have a concentration from about 3% to about 40%, and desirably from about 5% to about 30% based upon the total volume of the host matrix polymer. When generally shorter fillers are utilized and the aspect ratio is, therefore, lower, minimum concentration of the nanoparticles in the host matrix polymer is generally higher.

It has been surprisingly found that the key for fabricating nanocomposites that display switchable mechanical properties according to the present invention is to (1) select nanoparticles that can display desirable particle-particle interactions; (2) utilize a fabrication process, as described hereinabove, that leads to materials in which said nanoparticles substantially form a percolating network in said polymer matrix; (3) utilize a fabrication process that prevents significant phase separation of the nanoparticles; and (4) employ a polymer matrix that is able to let the stimulus switch on and off said particle-particle interactions.

For example, when nanocomposites of cellulose whiskers and EO-EPI, not according to the invention, were prepared by a prior art method as taught by M. Schroers, A. Kokil, and C. Weder, *J. Appl. Polym. Sci.* 93, 2883 (2004), materials were obtained that display a comparatively weak reinforcement through introduction of the whiskers. The reinforcement is much lower than predicted by the percolation model, which is described elsewhere in this application. This discrepancy is the result of phase separation of whiskers and polymer. As a result, these prior art: materials do not exhibit an appreciable change of their mechanical: properties if immersed in water. This is in stark contrast to materials of nominally similar composition, but which were prepared according to the present invention.

Fabrication of cellulose whisker nanocomposites according to the present invention. Lyophilized cellulose whiskers, prepared for example as taught by J. R. Capadona, O. van den Berg, L Capadona, D, Tyler, S. Rowan, and C. Weder, *Nature Nanotechnology* 2, 765 (2007), herein incorporated by reference, were dispersed in dimethyl formamide (DMF) at a concentration of 5 mg/ml. The EO-EPI copolymer or PVAc polymer was dissolved in DMF (5% w/w) by stirring for two days. Nanocomposites were prepared by combining the desired amounts (to yield materials containing 0.8%-19% v/v whiskers) of the colloidal whisker dispersion and polymer solution, and solution-casting the resulting homogeneous mixture into Teflon® Petri dishes. The dishes were placed into a vacuum oven (60° C., 15 mbar, EO-EPI=48 hrs.; PVAc=1 week) to evaporate the solvent and dry the resulting films, before the material was compression-molded between spacers in a carver laboratory press (EO-EPI=80° C. at 6000 psi for 2 min.; PVAc=90° C. at 0 psi for 2 min., followed by an increase of pressure to 3000 psi for 15 min.) to yield 50-500 μm thin nanocomposite films, The thermo-mechanical properties of the polymer nanocomposite materials can be established by dynamic mechanical analysis and tensile tests. It has been found that the mechanical contrast with respect to the tensile storage modulus is produced by swelling the polymer nanocomposite in a suitable solvent, such as those described hereinabove. The dry polymer nanocomposite exhibits the greatest tensile storage modulus, whereas equilibrium swelled polymer nanocomposites have a greatly reduced tensile storage modulus. As indicated hereinabove, the nanoparticles are "switched on" and assembled in a substantially percolating network in the absence of a solvent. Upon the addition of a solvent preferably a hydrogen bond forming solvent, to the polymer nanocomposite, the whisker self-interactions are "switched off" by competitive binding. In one embodiment, from about 10% w/w to about 85% w/w solvent based on the total weight of the composition is utilized. Relatively low amounts of solvent are preferred. Utilizing the switching techniques of the present invention, desirable changes in: modulus can be achieved. For example, between a first switched state and a second switched state, the modulus contrast is a factor of generally greater than 2.5, desirably 5 or more, and preferably 10 or more, and most preferably 20 or more. Examples of switching polymer nanocomposites follow.

Switching Experiments with EO-EPI/cellulose whisker nanocomposites. Compression molded EO-EPI/whisker nanocomposites were dried in a vacuum oven (60° C., 15 mbar, 48 hours) to remove all water and stored in a desiccator until dynamic mechanical analysis (DMA) measurements were made. For switching experiments according to invention vacuum-dried EO-EPI/whisker nanocomposites were placed into sealed vials filled with deionized water, artificial cerebral spinal fluid (ACSF) for 48 hours. The extent of swelling was determined gravimetrically from the original mass of the dry sample and the mass after swelling. Swollen samples were then either measured by DMA using a submersion chamber filled with deionized water or ACSF, or re-dried in vacuum (60° C., 15 mbar, 48 hours) and measured by DMA to explore the reversibility of mechanically switching.

Switching Experiments with PVAc/whisker Nanocomposites. Compression molded PVAc/whisker nanocomposites were dried in a vacuum oven (60° C., 15 mbar, 48 hours) to remove ail water and stored in a desiccator until DMA measurements were made. For switching experiments, vacuum-dried PVAc/whisker nanocomposites were placed into DMA using a submersion chamber filled with artificial cerebral spinal fluid (ACSF) at room temperature. The ACSF bath was heated at a nominal rate of 2° C./min to a temperature of 37° C., where the sample was held. DMA measurements were made throughout this process. ACSF was prepared, based on product information (Alzet Cupertino, Calif.).

Thermo Mechanical Testing. DMA temperature sweeps under oscillatory stress were performed on rectangular films of the neat polymers or the nano-composites using a TA instruments DMA Q800 in tensile mode with an oscillation frequency of 1 Hz, a static force of 10 mW, an oscillation amplitude of 15.0 μm, and an automatic tension setting of 125%. Measurements were carried out at a heating rate of 3°/min (range of 15° C.-45° C for EO-EPI nanocomposites). Swollen samples were measured using a submersion clamp, filled with the appropriate medium.

Stress-strain experiments were performed at room temperature on rectangular films of the neat polymers or the nanocomposites using a TA instruments DMA Q800 in constant strain mode with a strain rate of 2/min for the nanocomposites or 2 or 20%/min for the neat polymers an initial amplitude of 15.0 (dry samples) or 150 μm (swollen samples). Swollen nanocomposites were measured using a submersion clamp, filled with deionized water.

Figure 2A:
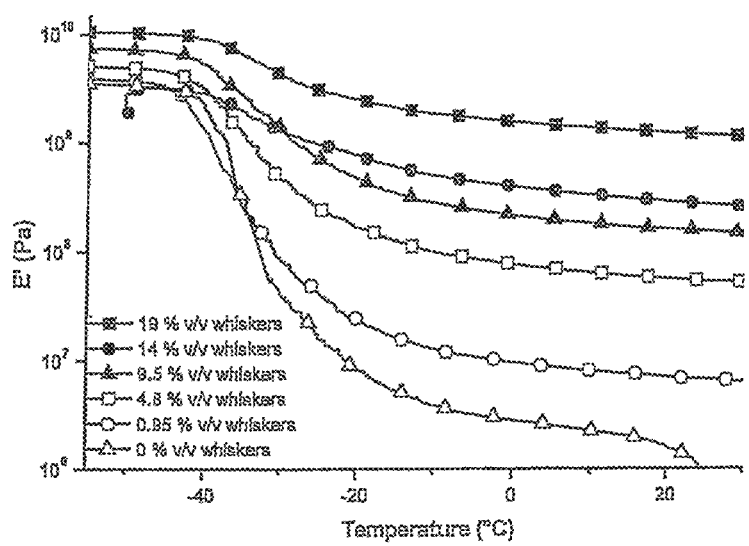
FIG. 2A graphically illustrates representative DMA traces that show tensile storage moduli $E'_c$ of dry EO-EPI and EO-EPI/whisker nanocomposites as a function of whisker content and temperature.
Figure 2B:
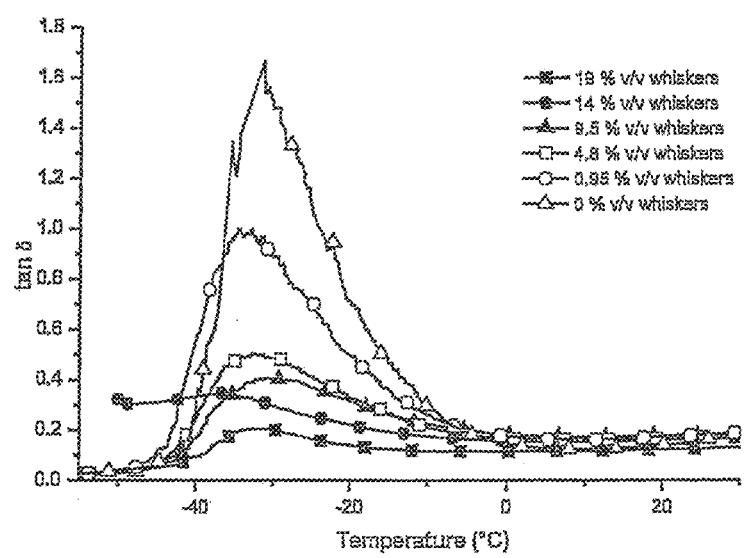
FIG. 2B graphically illustrates representative DMA traces that show loss tangents tan δ of dry EO-EPI and EO-EPI/whisker nanocomposites as a function of whisker content and temperature.
Figure 3:
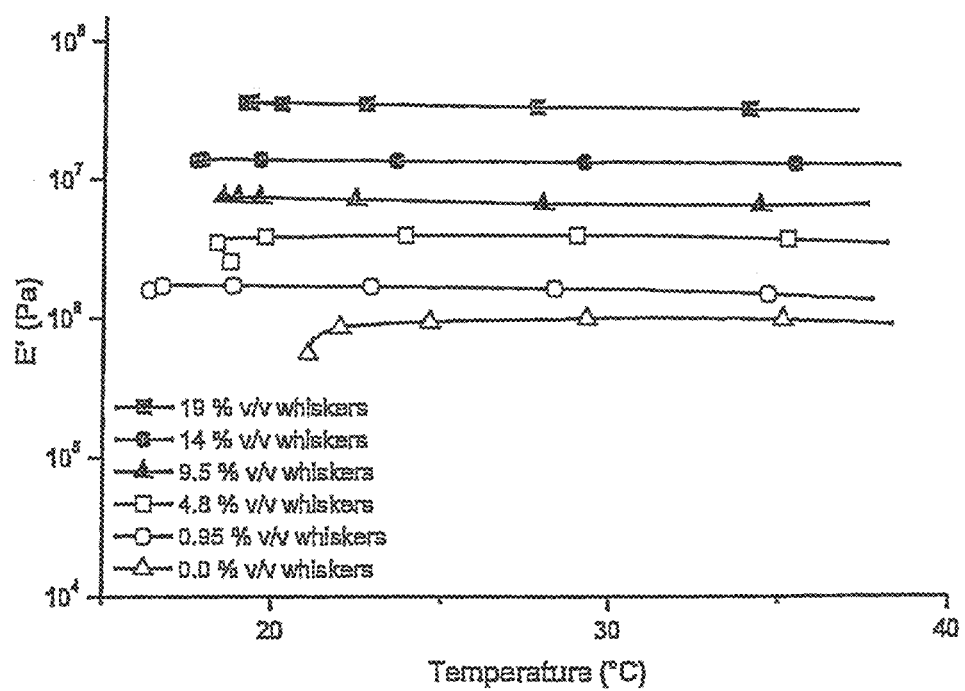
FIG. 3 graphically illustrates representative DMA traces that show tensile storage moduli $E'_c$ of EO-EPI and EO-EPI/whisker nanocomposites as a function of whisker content and temperature, and wherein the samples were equilibrated by immersion for 48 hours in deionized water and were measured under submersion in deionized water.
Figure 11A:
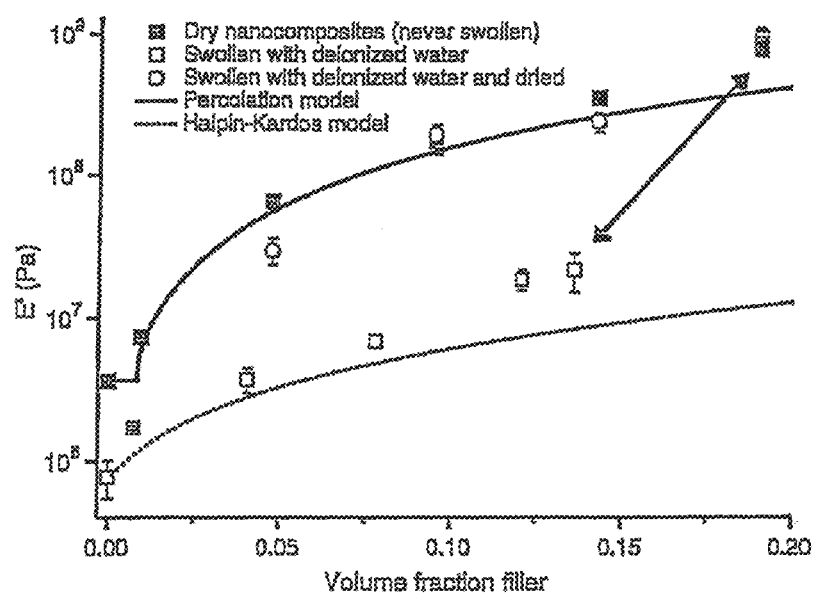
FIG. 11A illustrates tensile storage moduli E' of EO-EPI/whisker nano-composites as a function of volume fraction of cellulose whiskers, wherein the nanocomposites were conditioned by either drying in vacuum, equilibrium swelling in deionized water, or swelling to saturation in deionized water followed by redrying in vacuum; wherein lines represent values predicted by the percolation and Halpin-Kardos model; wherein the arrow indicates changes in modulus and volume fraction of whiskers resulting from aqueous swelling of one selected sample (19% v/v whiskers)

The thermo-mechanical properties of EO-EPI/whisker nanocomposites with a whisker content between 0 and 19% v/v were established by DMA and tensile tests, DMA temperature sweeps (FIGS, 2A, 2B and 3) display a glass transition temperature ($T_g$) around −37° C. (maximum of loss tangent, tan δ), which is independent on the whisker content and matches the $T_g$ of the neat EO-EPI matrix (FIGS. 2A, 2B). The intensity of tan δ decreases more than proportionally with the whisker concentration (FIG. 2B), which is indicative of attractive polymer-whisker interactions. FIG. 11A shows the tensile storage moduli ($E'_c$) of dry EO-EPI/whisker nanocomposites extracted from the DMA traces for a temperature of 25° C., i.e. in the rubbery regime far above $T_g$. $E'_c$ increased with the whisker content from ~3.7 MPa (neat polymer) to ~800 MPa (19% v/v whiskers). The observed reinforcement confirms the formation of a percolating nanofiber network in which stress transfer is facilitated by hydrogen-bonding between the whiskers. This hypothesis is supported by calculations obtained using a percolation model. Within the framework of the model, the tensile modulus of the nanocomposites ($E'_c$) can be expressed as:

$$E'_c = \frac{(1-2\psi+\psi X_r)E'_s E'_r + (1-X_r)\psi E'^2_r}{(1-X_r)E'_r + (X_r-\psi)E'_s} \quad (1)$$

with $$\psi = X_r\left(\frac{X_r - X_c}{1-X_c}\right)^{0.4} \quad (2)$$

where $E'_s$ and $E'_r$ are the experimentally determined tensile storage moduli of the neat EO-EPI (3.7 MPa) and a neat tunicate whisker film (4.0 GPa), respectively, $\psi$ is the volume fraction of whiskers that participate in the load transfer, $X_r$ is the volume fraction of whiskers, and $X_c$ is the critical whisker percolation volume fraction calculated by 0.7/A. A is the aspect ratio of the whiskers and has a value of 84 as determined by analysis of transmission electron microscope images, see FIG. 1.

Figure 4:
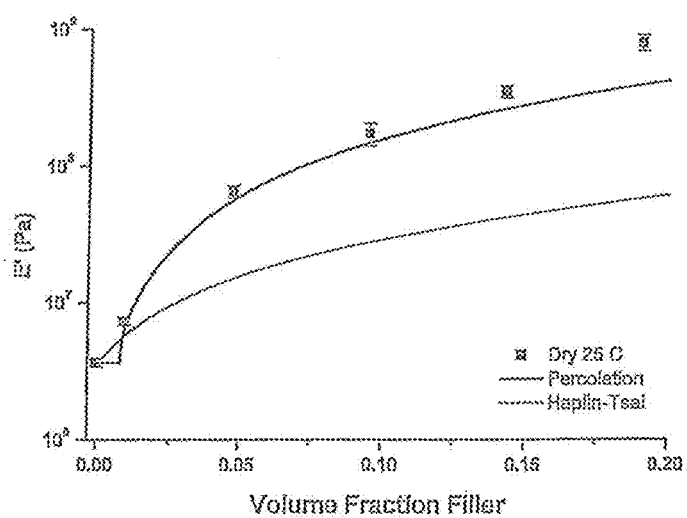
FIG. 4 illustrates tensile storage moduli $E'_c$ of EO-EPI and EO-EPI/whisker nanocomposites as a function of whisker content, wherein lines represent values predicted by the percolation and Halpin-Kardos model for dry samples, and: wherein data points represent averages (number of individual measurements, N, =3-5) +/− standard error measurements.
Figure 5:
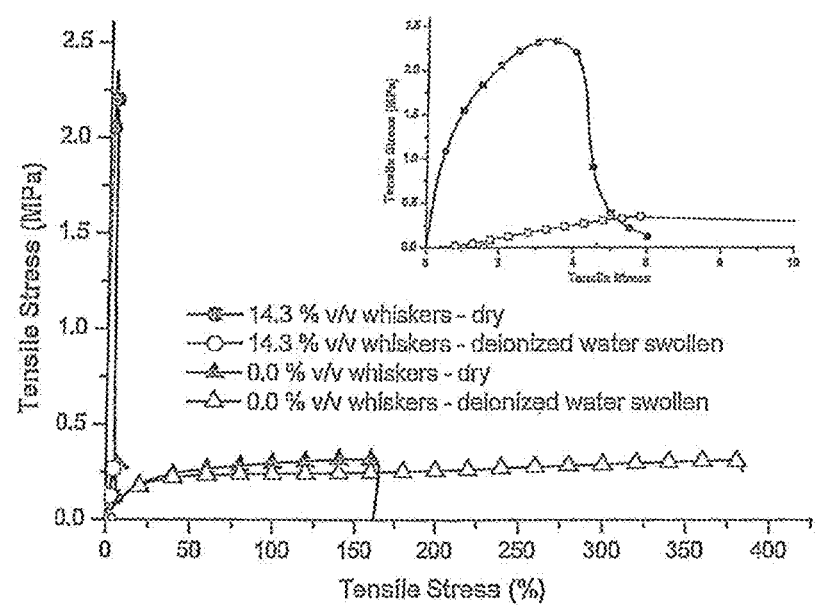
FIG. 5 illustrates representative stress-strain curves of neat EO-EPI and EO-EPI/whisker nanocomposites containing 14.3% v/v whiskers, wherein the materials were conditioned by either drying in vacuum or equilibrium swelling in deionized water.
Figure 6:
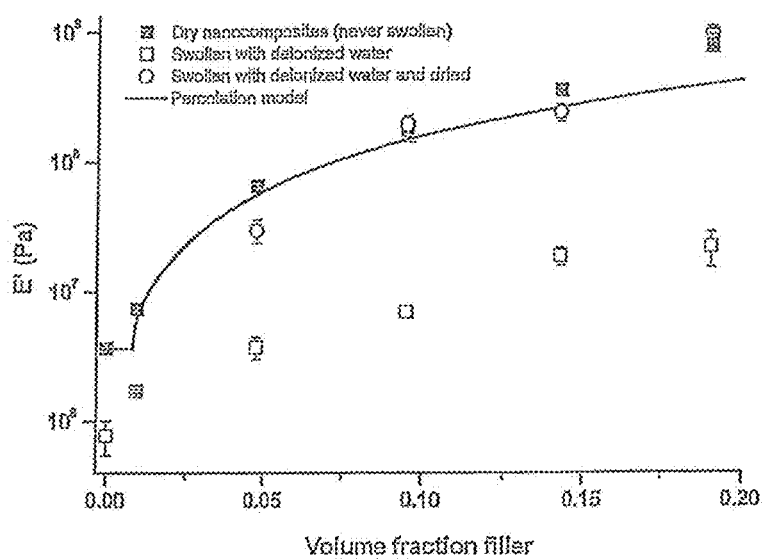
FIG. 6 illustrates tensile storage moduli $E'_c$ of EO-EPI/whisker nano-composites as a function of volume fraction of cellulose whiskers, wherein the nanocomposites were conditioned by either drying in vacuum, equilibrium swelling in deionized water, or swelling to saturation in deionized water followed by a re-drying in vacuum, wherein the data were taken from FIG. 2A, but data for the swollen samples were plotted for original whisker content to allow for a direct comparison of the $E'_c$ of dry and water-swollen composites for the same composition, and wherein data points represent averages (N=3-5) +/− standard error measurements.

FIG. 11A shows that the experimentally determined $E'_c$ values of dry EO-EPI/whisker nanocomposites agree with values obtained from Equation 1. By contrast, the data deviate strongly from the Halpin-Kardos model (FIG. 4, vide infra). This behavior is indicative for the formation of a percolating network of strongly interacting cellulose whiskers within the EO-EPI matrix. This architecture is confirmed by atomic force microscopy (AFM) and scanning electron microscopy (SEM) images, which both show that the cellulose whiskers form a percolating network within the EO-EPI matrix. Stress strain curves (FIG. 5) reveal that the formation of a percolating network of cellulose whiskers within the EO-EPI matrix not only affects $E'_c$, but also has a significant influence on the maximum tensile strength (σ), which increased from 0.27+/−0.04 (neat EO-EPI, stress at break) to 1.71+/−0.23 MPa (14.3% v/v whiskers, stress at yield), while the elongation at break was reduced from 360+/−20 to 6.7+/−0.8%, see Table 1.

TABLE 1

| Whisker Content (% v/v) | Sample Condition | Stress at yield point (MPa) | Stress at Break (MPa) | Elongation at Break (%) |
|---|---|---|---|---|
| 14.3 (N = 7) | Dry | 1.71 +/− 0.23 | 0.05 +/− 0.02 | 6.7 +/− 0.8 |
| 14.3 (N = 5) | Swollen | 0.37 +/− 0.11 | 0.29 +/− 0.7 | 17.8 +/− 3.9 |
| 0 (N = 2) | Dry | Not Applicable | 0.27 +/− 0.04 | 360 +/− 20 |
| 0 (N = 2) | Swollen | Not Applicable | 0.34 +/− 0.04 | 263 +/− 100 |

Figure 11B:
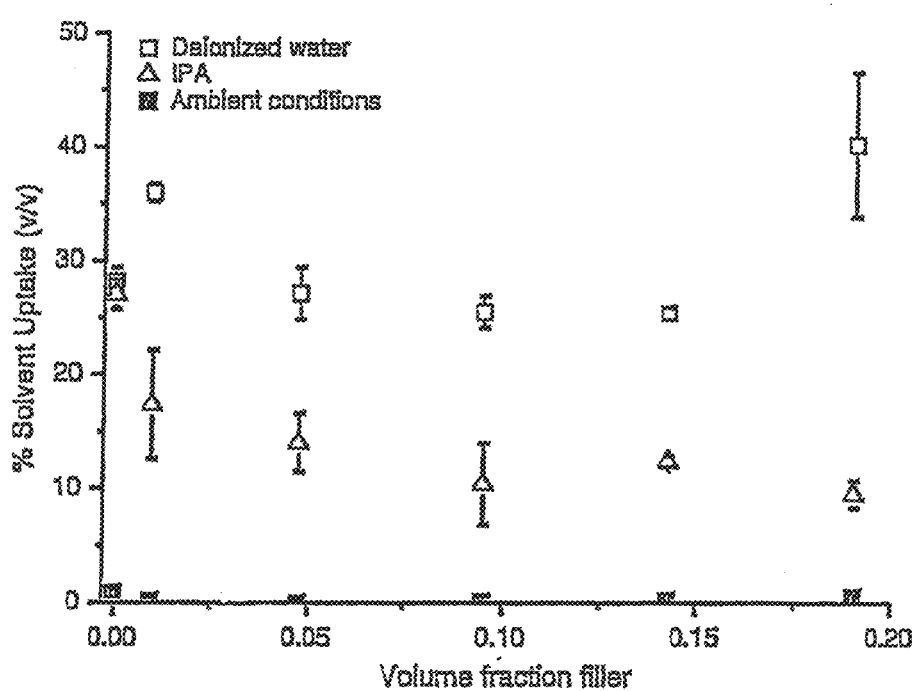
FIG. 11B illustrates solvent uptake as a function of whisker volume fraction under ambient conditions, immersion in deionized water, or isopropanol at room temperature.

To demonstrate that water could act as a chemical regulator for the whisker-whisker interactions in the EO-EPI/whisker nanocomposites, the mechanical properties of these materials were tested as a function of water exposure. The atmospheric water uptake of the materials is negligible under ambient conditions; i.e., if not placed in an aqueous medium (FIG. 11B). Dry EO-EPI/whisker nanocomposites were immersed in deionized water for 48 hours to achieve equilibrium swelling (FIG. 11B). Under these conditions, all compositions investigated exhibit modest aqueous swelling (ca. 30% v/v), indicating that in case of these compositions the water uptake is mainly governed by the matrix polymer with only minor variations due to whisker content. The tensile storage moduli for water-swollen EO-EPI/whisker nanocomposites were measured by DMA at 25° C. in deionized water. A very significant reduction of $E'_c$ compared to the dry nanocomposites can be observed (FIG. 11A). The greatest mechanical contrast is seen in the case of the nanocomposite with the highest whisker content (nominally 19% v/v), where $E'_c$ was reduced from ~800 to 20 MPa upon equilibrium swelling. At the same time, swelling with water leads to a significant decrease of the tensile strength (1.71+/−0.23 to 0.37+/−0.11 MPa for a 14.3% v/v whisker nanocomposite, FIG. 5, Table 1 and an increase of the elongation at break (6.7+/−0.8 to 17.8+/−0.39%). Control experiments with the neat EO/EPI (FIG. 5, Table 1) show minimal changes in tensile strength upon deionized water swelling.

Figure 7:
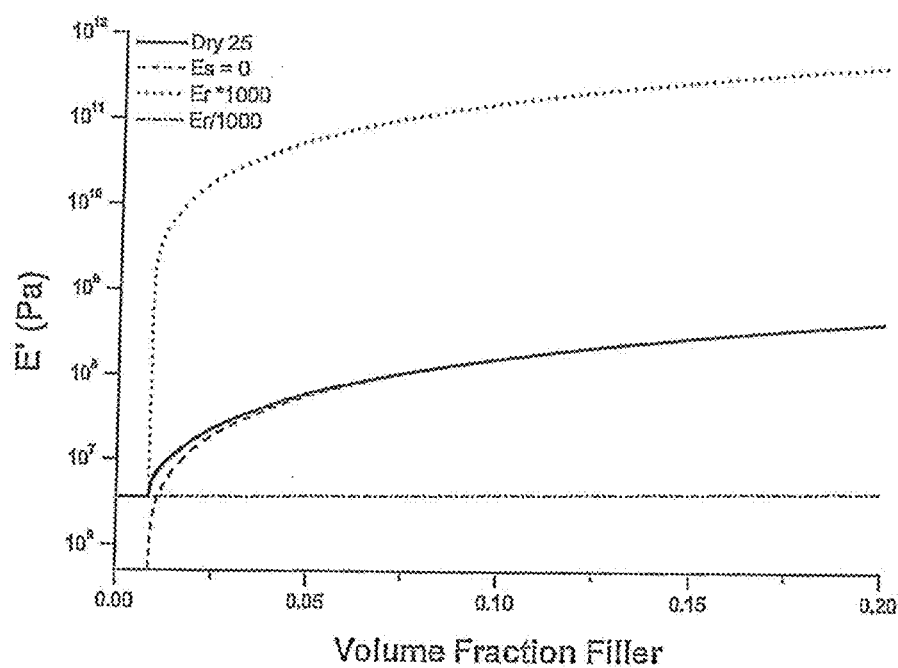
FIG. 7 illustrates systematic variations made to individual parameters fed into the percolation model, wherein lines represent (i) the model used to fit vacuum-dried nano-composites in FIG. 2A, (ii) same as; (i) but with $E'_s=0$; (iii) same as (i) but with $E'_r \times 1000$; (iv) same as (i) but with $E'_r/1000$, wherein setting $E'_s$ to zero represents a complete failure in the mechanical integrity of the matrix polymer; and wherein variations in $E'_r$ are made to investigate effects of strengthening (1000 times), or weakening (1/1000 times) the whisker-whisker interactions.

One argument that could be made against the interpretation that the observed changes in modulus, elongation at break, and tensile strength are the result of switching off the nanofiber-nanofiber interactions is that simple swelling of the matrix alone could lead to a plasticizing effect; however, careful analysis of our data shows that this is not the case, DMA traces (FIGS. 2A & 2B) indicate that the EO-EPI/whisker nano-composites do not undergo any phase transition that would lead to a drop in modulus, such as cross-linked polymer hydrogels and hygroscopic polymers, which can display a decrease of the glass transition temperature upon water uptake. While $E'_s$ of the neat EO-EPI is reduced from 3.7 to 0.8 MPa upon equilibrium swelling with water (FIG. 11A), analysis in the context of the percolation model (Equations 1-2, FIG. 7) shows that a reduction of $E'_s$ alone cannot account for a significant reduction of $E'_c$. FIG. 11A also reveals that even after correcting $X_r$ for water uptake, the percolation model no longer adequately describes $E'_c$ of the water-swollen nanocomposites. By contrast, the moduli now are in much closer agreement with the Halpin-Kardos model, which has successfully been used to describe the modulus of nanocomposites in which the filler is homogeneously dispersed in a polymer matrix and does not display pronounced filler-filler interactions. The model assumes that the materials are equivalent to many layers of unidirectional plies oriented in alternating directions (−45°, 0°, 45°, and 90°) and the properties of the unidirectional reference ply are predicted by the Halpin-Tsal equations where the modulus in the longitudinal ($E_L$) and transverse ($E_T$) directs are given by:

$$E_L = E_m(1+2(A)\eta_L\phi_w)/(1-\eta_L\phi_w) \quad (3) \text{ and}$$

$$E_T = E_m(1+2\eta_T\phi_w)/(1-\eta_T\phi_w) \quad (4)$$

Thus, all data indicate that the stiffness reduction achieved in the EO-EPI/whisker nanocomposites is related to the decoupling of the stress-transferring rigid nanofiber network upon introduction of water as a competitive hydrogen-bonding agent. Consistent with the proposed mechanism, the switching is fully reversible: the materials adapted their original stiffness upon drying (FIG. 11A).

Figure 11C:
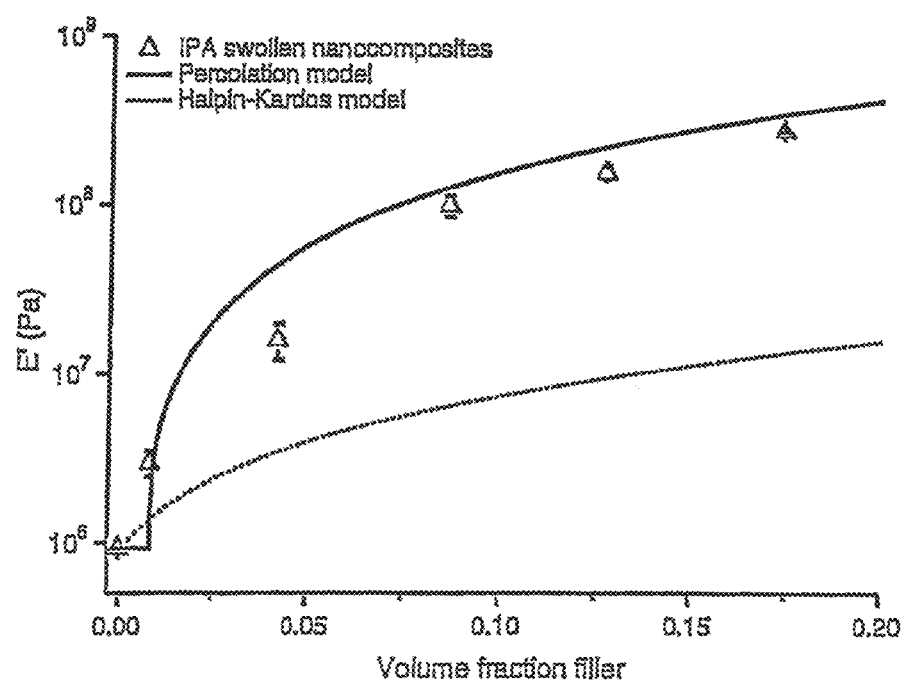
FIG. 11C illustrates tensile storage moduli E' of IPA-swollen EO-EPI/whisker nanocomposites as a function of volume fraction of cellulose whiskers; wherein lines represent values predicted by the percolation and Halpin-Kardos model, and wherein data points represent averages (number of individual measurements, N=3-6)±standard error measurements.
Figure 12:
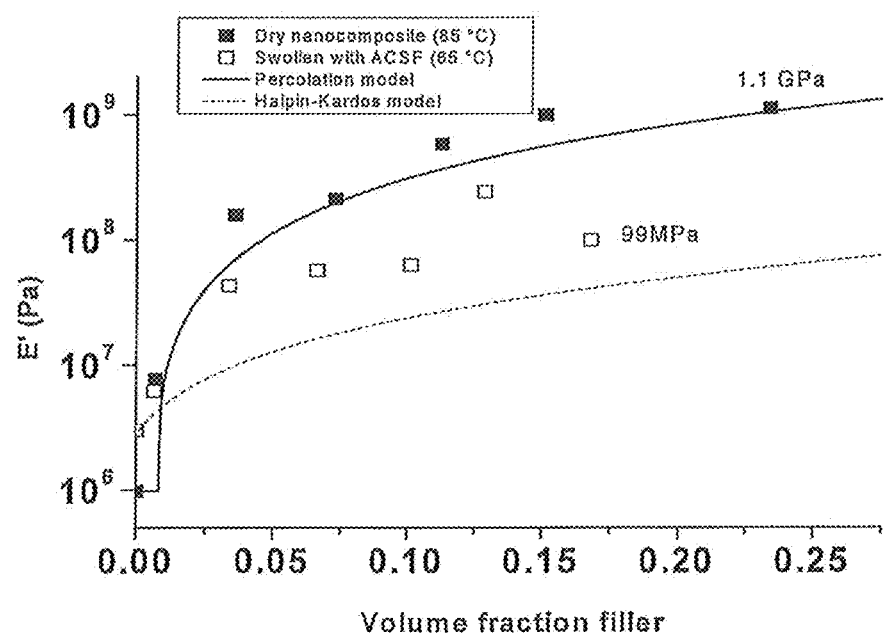
FIG. 12 illustrates tensile storage moduli $E'_c$ of PBMA and PBMA/whisker nanocomposites (dry and water swollen) as a function of whisker content, wherein lines represent values predicted by the percolation and Halpin-Kardos model for dry and water-swollen samples, respectively; wherein data points represent averages (number of individual measurements, N≥2); and wherein ACSF swollen samples with higher whisker content display decreased moduli closer to the Halpin-Kardos model, most likely due to the increased swelling at high whisker content.

To demonstrate specificity of the switching mechanism, isopropanol (IPA) was used as the swelling agent. IPA was selected because it swells neat EO-EPI to a similar degree as wafer (FIG. 1TB), but is incapable of dispersing cellulose, whiskers. The nanocomposites swelled upon immersion in IPA (FIG. 11B) to a level similar to that of the composites in water; however $E'_c$ barely changed in comparison to the dry state (FIG. 11C) and the data fit the percolation model. This result confirms that the chemo-mechanical response is largely a result of disruption of the whisker-whisker interactions and not just simply plasticization of the material. By contrast, EO-EPI is plasticized considerably upon IPA swelling ($E'_c$ drops from 3.6 to 0.93 MPa). This contrast highlights the most important advantage of the nanocomposite approach over simple plasticization of a neat polymer. While plasticization through solvent uptake, which is inherent to the latter, is a non-specific process, the responsive nanocomposites can be designed to display a response that is specific to the nature of the stimulus. In addition, the nanocomposite approach provides the ability to increase the initial stiffness and strength of the material and allows for the use of host polymers that have no thermal transition in the temperature regime of interest, such as the EO-EPI matrix used here.

Figure 8A:
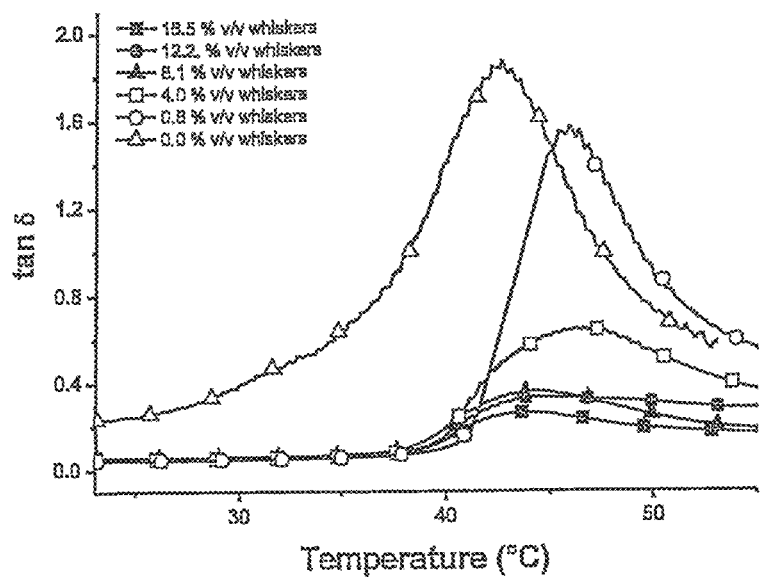
FIG. 8A illustrates loss tangents tan δ of dry PVAc and PVAc/whisker nanocomposites as a function of whisker content and temperature.
Figure 8B:
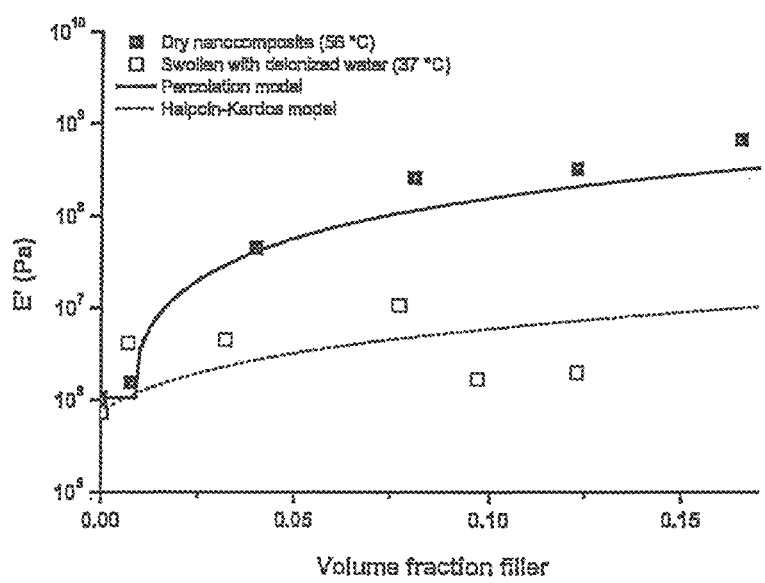
FIG. 8B illustrates tensile storage moduli $E'_c$ of PVAc and PVAc/whisker nanocomposites (dry and water swollen) as a function of whisker content, wherein lines represent values predicted by the percolation and Halpin-Kardos model for dry and water-swollen samples, respectively; wherein data points represent averages (number of individual measurements, E≥2); and wherein water swollen samples with higher whisker content display decreased moduli below the Halpin-Kardos model, most likely due to the increased swelling at high whisker content.
Figure 9:
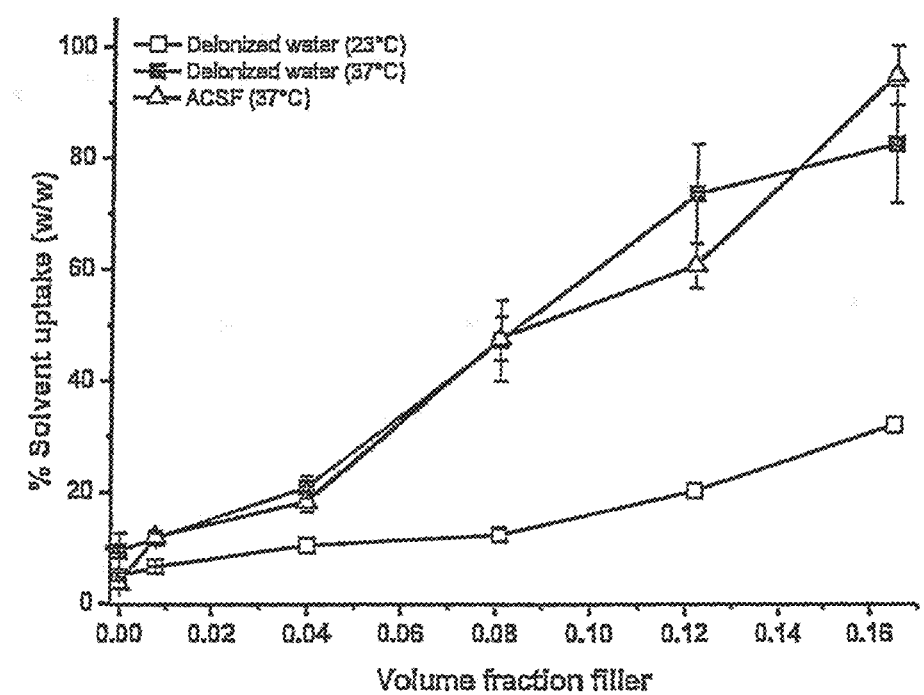
FIG. 9 illustrates solvent uptake as a function of whisker volume fraction and temperature upon immersion (to equilibration) ion deionized water or ACSF; wherein data points represent averages (N=4-5) +/− standard error measurements.
Figure 10A:
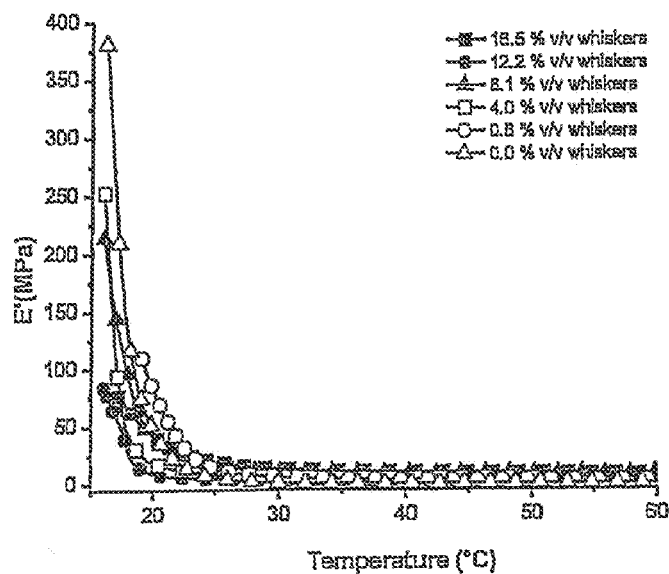
FIG. 10A illustrates representative DMA traces that show tensile storage moduli E'c of water-swollen PVAc and PVAc/whisker nanocomposites as a function of whisker content and temperature.
Figure 10B:
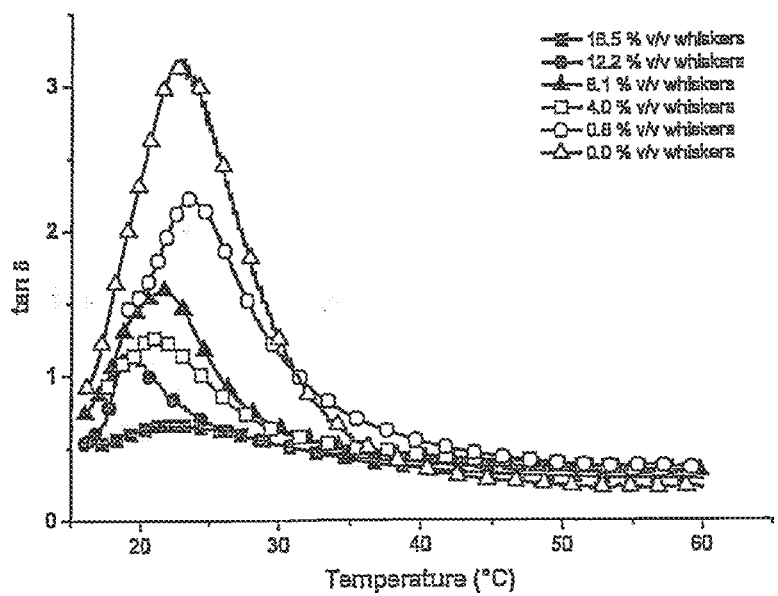
FIG. 10B illustrates representative DMA traces that show loss tangents tan δ of water-swollen PVAc and PVAc/whisker nanocomposites as a function of whisker content and temperature.

To further maximize the dynamic range in which the mechanical properties of the nanocomposites according to the present invention can be switched, we sought to combine the switching mechanism with a chemically influenced thermal transition. We surprisingly discovered that nanocomposites based on polyvinyl acetate) (PVAc) and cellulose whiskers display such a "dual" responsive behavior. Our data show that upon exposure to physiological conditions the materials undergo a phase transition; in addition, the reinforcing whisker network is disassembled. DMA experiments (FIG. 8) reveal that the neat PVAc displays a $T_g$ around 42° C.; i.e., just above physiological temperature. E' of the neat polymer is considerably reduced upon heating from room temperature (1.8 GPa at 23° C.) to above $T_g$ (0.39 MPa at 56° C.; this corresponds to $T_g$+16° C. and marks the temperature at which E' is starting to level off). As evidenced by DMA data, the introduction of cellulose whiskers into PVAc has only a minimal influence on $T_g$ in the dry state (FIG. 8). The thermal transition is sharpened and the temperature at which $E'_c$ begins to drop is increased from about 25 to over 40° C. For certain biomedical applications, this effect is very desirable, as it prevents the thermally-induced softening of the material just upon exposure to body temperature. As a consequence of the already rather high stiffness of the glassy PVAc matrix, only a modest reinforcement is observed for the nanocomposites below $T_g$ ($E'_c$=5.1 GPa with 16.5% v/v whiskers, Supplementary FIG. 8). However, a dramatic effect is observed above $T_g$, where E' is increased from 1.0 MPa for the neat polymer matrix up to 814 MPa with 16.5% v/v whiskers (at 56° C.). The experimental data above $T_g$ match well with the percolation model (FIG, 8), which indicates that also in this series a percolating network of strongly interacting whiskers is formed. The nanocomposites demonstrate significant swelling in both deionized water and ACSF. The solvent uptake increases with increasing whisker content and temperature (FIG. 9), lowers the $T_g$ to below physiological temperature (19-23° C., FIG. 10), and reduces $E'_c$ dramatically. For example, the $E'_c$ of a 16.5% v/v whisker nanocomposite above $T_g$ is reduced from 814 MPa (dry) to 10.8 MPa (water swollen; data are for 56 and 37° C., respectively; i.e., 16° C. above the respective $T_g$). As for the wafer-swollen PEO-EPI/whisker nanocomposites, the moduli of the wet PVAc/whisker nanocomposites are better described by the Halpin-Kardos than the percolation model (FIG. 8), again indicative of decoupling of the stress-transferring nanofiber network upon introduction of water.

Exposure to brain tissue, simulated here by immersing the samples into artificial cerebral spinal fluid (ACSF) and heating to a physiological temperature of 37° C. at ~2° C./min, leads to a pronounced reduction of $E'_c$. While the neat PVAc (dry $E'_c$=1.8 GPa at 25° C.) instantly softens under these conditions, the $E'_c$ of the whisker-reinforced nanocomposites is reduced slowly over a period of 15 min. The whisker-reinforced nanocomposite displays a much higher dry $E'_c$= (4.2 GPa at 25° C.) than the neat PVAc, but both materials reach nearly identical moduli upon immersion in ACSF at 37° C. (1.6 MPa).

In another set of experiments, the effect of the hydrophilicity of the matrix polymer on the dynamic mechanical properties of the nanocomposite was studied using polybutylmethacrylate (PBMA). PBMA, which is an amorphous polymer having $T_g$ around 70° C., was dissolved in DMF (5% w/w) by stirring for two days. Nanocomposites were prepared by combining the desired amounts (to yield materials containing 0.7%-23% v/v whiskers) of the colloidal whisker dispersion and polymer solution, and solution-casting the resulting homogeneous mixture into Teflon® Petri dishes. The dishes were placed into a vacuum oven (60° C., 15 mbar, 1 week) to evaporate the solvent and dry the resulting films, before the material was compression-molded between spacers in a carver laboratory press (90° C. at 0 psi for 2 min., followed by an increase of pressure to 3000 psi for 15 min.) to yield 50-500 μm thin nanocomposite films. PBMA tunicate whisker nanocomposites also showed a similar stimuli responsive switching behavior but the contrast was less due to reduced water uptake. For example, the $E'_c$ of a 23% v/v whisker nanocomposite above $T_g$ was reduced from 1.1 GPa (dry) to 99 MPa after being swollen in ACSF at 37° C. (In this case the $E'_c$ data are given for 85° C. and 65° C., respectively; i.e., ~15° C. above the respective $T_g$). PBMA is relatively less hydrophilic than PVAc and shows a $T_g$ around 50° C. when plasticized. Hence, swelling at 37° C. (below the $T_g$) led to a very moderate water uptake (33%) and a significantly higher wet modulus (99 MPa). Swelling the same nanocomposite at 65° C. (i.e. 15° C. above Tg), instead of 37° C. as described above, led to higher water uptake (79%) and lower wet modulus (32 MPa). This illustrates the synergistic interaction of thermal transition and swelling to effect the dynamic change in modulus in these systems.

In another set of experiments, blends of PBMA and PVAc also showed similar switching behavior. Tunicate whisker nanocomposites with PVAc/PBMA blends prepared by a similar method as above displayed a systematic increase in aqueous swelling and decrease in wet modulus at 37° C. with increasing PVAc content. Specifically, for a 12.2% v/v tunicate whisker PVAc/PBMA blend nanocomposite, as PVAc content was increased from 20% to 60%, swelling in ACSF at 37° C. increased from 35% to 60% and wet modulus at 37° C. dropped from 100 MPa to 24 MPa, while the dry modulus at 25° C. remained between 4 to 5 GPa.

In another study, use of a hydrophobic polymer such as polyethylene as matrix showed a lesser contrast in modulus due to limited aqueous swelling. Under similar switching conditions, polyethylene tunicate whisker nanocomposite prepared by a template approach such as described by J. R. Capadona, O. van den Berg, L. Capadona, D, Tyler, S. Rowan, and C. Weder, Nature Nanotechnology 2, 765 (2007), herein incorporated by reference, displayed a contrast in modulus from 1.5 GPa (dry, 25° C.) to 700 MPa (wet 37° C.) for 35 wt. % whiskers. In addition, to water and ACSF, softening of the same nanocomposite was also observed when swollen in N,N-dimethylformamide which is known to disperse the whiskers but not solubilize the polymer. As will be evident to those skilled in the art, any solvent that disperses the whiskers (as demonstrated by O. van den Berg, J. R. Capadona, and C. Weder, Biomacromolecules 8, 1353 (2007)), but does not dissolve the matrix polymer, should serve as a sufficient chemical switching mediator.

In another study we also found that the aqueous swelling and wet modulus of the nanocomposites can be tailored by substituting in a controlled manner the hydroxyl groups of cellulose with hydrophobic moieties. Esterification of cellulose with 2-Dodecen-1-yl succinic anhydride and incorporation of these modified whiskers in PVAc by solution casting as described above significantly limits the aqueous swelling. In a preferred embodiment, PVAc nanocomposite with 12.2% v/v of these modified whiskers displayed a,swelling of about 10-50% (ACSF 37° C., 1 week) and a wet modulus at 37° C. of 15-40 MPa while the dry modulus at 25° C. remained between 4-5 GPa.

In another study, we also found that the wet modulus of the nano-composites can be tailored by substituting, in a controlled manner, the hydroxyl groups of cellulose with carboxylic acid moieties. Oxidation of the primary hydroxyl groups and incorporation of these modified whiskers in PEO-EPI by solution casting, as described above, significantly decreases the modulus of the aqueous swollen nanocomposites, by up to 10 fold, in a preferred embodiment, PEO-EPI nano-composite with 18% v/v of these modified whiskers displayed a wet modulus at 25° C. of 5.85 MPa while the dry modulus at −52° C. (−15° C. below $T_g$) remained between 8-9 GPa.

We also found the dynamic change in modulus of nanocomposites to be effective using other sources of cellulose as reinforcement. Cellulose whiskers derived from cotton with a lower aspect ratio of about 11 also displayed a significant switching in modulus. In a preferred embodiment, a 12.2% v/v cotton whisker PVAc nanocomposite prepared as described above showed a limited swelling of about 20% (ACSF 37° C., 1 week) and a switch in modulus from 4 GPa (dry, 25° C.) to 5 MPa (wet 37° C.).

In accordance with the patent statutes, the best mode and preferred embodiment have been set forth; the scope of the invention is not limited thereto, but rather by the scope of the attached claims.

What is claimed is:

1. A polymer nanocomposite, comprising:
a nanoparticle network incorporated into a host matrix polymer, wherein the nanoparticle network is a formation of a substantially three-dimensional network of substantially dispersed nanoparticles, wherein in a first switched state, the nanocomposite has a first modulus, and wherein in a second unswitched state, the nanocomposite has a second modulus, wherein the first modulus is greater than the second modulus by a factor greater than 2.5, wherein the switchable modulus function is inducable by a chemical stimulus, or an electrical stimulus or an optical stimulus or a combination thereof.

2. The nanocomposite according to claim 1, wherein the nanoparticles comprise nanofibers, and wherein the nanofibers are present in the polymer nanocomposite in an amount from about 3% to about 40% by volume based on the total volume of the matrix polymer.

3. The nanocomposite according to claim 2, wherein the nanoparticles are present in an amount from about 5% to about 30% by volume based on the total volume of the matrix polymer.

4. The nanocomposite according to claim 3, wherein the nanoparticles have particle to particle interaction due to hydrogen bonding, ionic charges, hydrophobic interactions or pi-pi stacking, or a combination thereof and wherein the nanoparticles have an average aspect ratio (length/diameter) of 5 or more.

5. The nanocomposite according to claim 1, wherein the nanoparticles comprise nanofibers, nanotubes, nano-size platelet materials, or a combination thereof.

6. The nanocomposite according to claim 5, wherein the nanoparticles are in a form of a substantially percolating network in the first switched state.

7. The nanocomposite according to claim 5, wherein the host matrix polymer comprises an alkylene oxide polymer, an alkylene oxide copolymer, a vinyl aromatic polymer, a vinyl aromatic copolymer, polyolefin polymer, a polyolefin copolymer, a diene polymer, a diene copolymer, a polyacrylate, an acrylate copolymer, a polyamide, a polyester polymer or a polyester copolymer, or a combination thereof.

8. The nanocomposite according to claim 7, wherein the polymer is an ethylene oxide polymer, an ethylene oxide copolymer, a polyester polymer, or a polyester copolymer, or a combination thereof, wherein the nanoparticles have an average aspect ratio (length/diameter) of about 10 or more, and wherein the modulus change exhibited is by a factor of 5 or more.

9. The nanocomposite according to claim 8, wherein the modulus change exhibited is by a factor of 10 or more, and wherein the nanoparticles comprise cellulose whiskers.

10. The nanocomposite according to claim 1, wherein the nanoparticles have an average aspect ratio (length/diameter) of 20 or more, wherein the nanoparticles are present in the polymer nanocomposite in an amount from about 3% to about 40% by volume based on the total volume of the matrix polymer, wherein the nanoparticles comprise nanofibers, carbon nanotubes, nano-size platelet materials, or a combination thereof, and wherein the modulus change exhibited is by a factor of 40 or more.

11. A polymer nanocomposite, comprising:
a nanoparticle network incorporated into a host matrix polymer, wherein the nanoparticle network is a substantially continuous three-dimensional network of substantially dispersed nanoparticles; wherein a modulus change in the polymer nanocomposite is functionally inducible by exposing the polymer nanocomposite to a stimulus that comprises a chemical stimulus or an optical stimulus or a combination thereof that reduces nanoparticle self-interactions, and wherein the modulus change exhibited is by a factor greater than 2.5.

12. The nanocomposite according to claim 11, wherein the modulus change is by a factor of 5 or more, wherein the nanoparticles comprise nanofibers, nanotubes, nano-size platelet materials, or a combination thereof, wherein the host matrix polymer comprises an alkylene oxide polymer, an alkylene oxide copolymer, a vinyl aromatic polymer, a vinyl aromatic copolymer, polyolefin polymer, a polyolefin copolymer, a diene polymer, a diene copolymer, a polyacrylate, an acrylate copolymer, a polyamide, a polyester polymer or a polyester copolymer, or a combination thereof.

13. The nanocomposite according to claim 12, wherein the nanoparticles comprise nanofibers, and wherein the nanofibers are present in the polymer nanocomposite in an amount from about 3% to about 40% by volume based on the total volume of the matrix polymer, wherein the nanoparticles have an aspect ratio (length/diameter) of 10 or more, and wherein the modulus change exhibited is by a factor of 10 or more.

14. A polymer nanocomposite, comprising:
a nanoparticle network incorporated into a host matrix polymer, wherein the nanoparticle network is a formation of a substantially three-dimensional network of substantially dispersed nanoparticles, wherein in a first switched state, the nanocomposite has a first modulus, wherein in a second unswitched state, the nanocomposite has a second modulus, wherein the first modulus is greater than the second modulus by a factor greater than 2.5, and wherein the nanoparticles are biorenewable nanoparticles.

15. The nanocomposite according to claim 14, wherein the biorenewable nanoparticles comprise nanofibers, and wherein the biorenewable nanofibers are present in the polymer nanocomposite in an amount from about 3% to about 40% by volume based on the total volume of the matrix polymer.

16. The nanocomposite according to claim 15, wherein the biorenewable nanoparticles are present in an amount from about 5% to about 30% by volume based on the total volume of the matrix polymer.

17. The nanocomposite according to claim 16, wherein the biorenewable nanoparticles have particle to particle interaction due to hydrogen bonding, ionic charges, hydrophobic interactions or pi-pi stacking, or a combination thereof and wherein the biorenewable nanoparticles have an average aspect ratio (length/diameter) of 5 or more.

18. The nanocomposites according to claim 14, wherein the biorenewable nanoparticles comprise nanofibers or cellulose-based whiskers, or a combination thereof.

19. The nanocomposites according to claim 18, wherein the biorenewable nanoparticles are in a form of a substantially percolating network in the first unswitched state, and wherein the host matrix polymer comprises an alkylene oxide polymer, an alkylene oxide copolymer, a vinyl aromatic polymer, a vinyl aromatic copolymer, polyolefin polymer, a polyolefin copolymer, a diene polymer, a diene copolymer, a polyacrylate, an acrylate copolymer, a polyamide, a polyester polymer or a polyester copolymer, or a combination thereof.

20. The nanocomposites according to claim 19, wherein the polymer is an ethylene oxide polymer, an ethylene oxide copolymer, a polyester polymer, or a polyester copolymer, or a combination thereof, wherein the biorenewable nanoparticles have an aspect ratio (length/diameter) of about 10 or more, and wherein the modulus change exhibited is by a factor of 5 or more.

* * * * *

UNITED STATES PATENT AND TRADEMARK OFFICE
CERTIFICATE OF CORRECTION

PATENT NO. : 9,260,573 B2
APPLICATION NO. : 13/718027
DATED : February 16, 2016
INVENTOR(S) : Christoph Weder et al.

It is certified that error appears in the above-identified patent and that said Letters Patent is hereby corrected as shown below:

In the specification

In column 1, line 3, after the title please list the following:

--STATEMENT OF GOVERNMENT SUPPORT

This invention was made with government support under Contract No. 5R21N8053798 awarded by the National Institutes of Health. The government has certain rights in the invention.--

Signed and Sealed this
Tenth Day of May, 2016

Michelle K. Lee
*Director of the United States Patent and Trademark Office*